United States Patent
Leimgruber et al.

[15] 3,689,498
[45] Sept. 5, 1972

[54] HALIDE AND SULFATE SALTS OF 5-AMINO-ISOXAZOLYLMETHYLENE DIALKYLAMINE

[72] Inventors: Willy Leimgruber, Montclair; Manfred Weigele, North Caldwell, both of N.J.

[73] Assignee: Hoffmann-La Roche Inc., Nutley, N.J.

[22] Filed: July 20, 1970

[21] Appl. No.: 56,715

[52] U.S. Cl. ...260/307 H, 260/256.4 N, 260/465.5 R
[51] Int. Cl. ............................................C07d 85/22
[58] Field of Search...................................260/307 H

[56] References Cited

UNITED STATES PATENTS 3,391,154    7/1968    Den Hollander..........260/307

*Primary Examiner*—Alex Mazel
*Assistant Examiner*—R. V. Rush
*Attorney*—Samuel L. Welt, Jon S. Saxe, Bernard S. Leon, William H. Epstein and George M. Gould

[57] ABSTRACT

Halide and sulfate salts of 5-amino-4-isoxazolylmethylene dialkylamine and a process for the preparation of these salts. These salts are intermediates for 4-amino-2-methylpyrimidine utilized in the synthesis of thiamine.

3 Claims, No Drawings

HALIDE AND SULFATE SALTS OF 5-AMINO-ISOXAZOLYLMETHYLENE DIALKYLAMINE

BACKGROUND OF THE INVENTION

The compound 4-amino-2-methylpyrimidine 5-carboxamide, an important intermediate in the synthesis of thiamine, has been synthesized via cyanoacetamide. This process suffers from the disadvantage that cyanoacetamide has been a difficult material to synthesize economically. Generally, cyanoacetamide is synthesized from $\alpha$-chloroacetic acid in four steps. The use of a four-step synthesis provides obvious drawbacks as far as yields and economics are concerned. Furthermore, chloroacetic acid is a rather expensive starting material. Therefore, it has long been desired to provide a simple and economic means to synthesize 4-amino-2-methylpyrimidine 5-carboxamide from inexpensive and readily available starting materials.

SUMMARY OF THE INVENTION

In accordance with this invention, it has been found that 4-amino-2-methylpyrimidine 5-carboxamide, which has the formula:

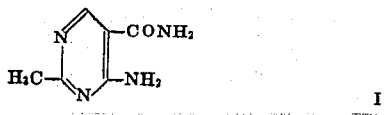

I can be easily synthesized from 2-cyano-3-di(lower alkyl)amino acrolein which has the formula:

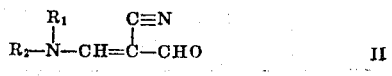

II wherein R1 and R2 are lower alkyl.

The compound of formula II is simply and economically synthesized from a compound of the formula:

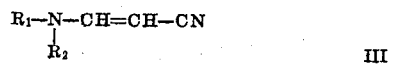

III wherein R1 and R2 are as above.

The compound of formula III can be easily synthesized from readily available and commercially economical materials by two methods. In the first method of producing the compound of formula II above, an acetal compound of the formula:

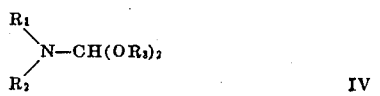

IV wherein R1 and R2 are as above; and R3 is lower alkyl; is condensed at a temperature of at least 80° C. with acetonitrile. In accordance with the second method of producing the compound of formula III above, a compound of the formula:

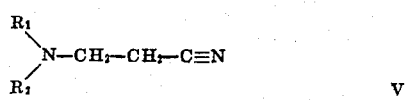

V wherein R1 and R2 are as above; is treated with a hydrogen acceptor at a temperature of at least 50° C. in the presence of a dehydrogenation catalyst.

DETAILED DESCRIPTION

As used throughout the specification, the term "lower alkyl" includes both straight and branched chain alkyl groups containing from one to six carbon atoms such as methyl, ethyl, propyl, isopropyl, and the like. As used throughout the specification, the term "halide" includes all four halide ions such as bromide, chloride, fluoride or iodide.

The reaction of acetonitrile with the acetal of formula IV to form the compound of formula III is carried out at a temperature of at least 80°. Generally, it is preferred to utilize a temperature of from 100° to 250° C. in carrying out this reaction. While this reaction can be carried out at atmospheric pressure, superatmospheric pressures are utilized when higher temperatures are utilized. This reaction can be carried out without the need for utilizing any solvent. However, if desired, an inert organic solvent can be utilized. Any conventional inert organic solvent such as benzene, toluene, N,N-dimethylformamide, can, if desired be utilized in carrying out this reaction.

The second method of preparing the compound of formula III above is by treating a compound of formula V above with a hydrogen acceptor at a temperature of at least 50° C. in the presence of a dehydrogenation catalyst. Any conventional dehydrogenation catalyst can be utilized in carrying out this reaction. Among the preferred dehydrogenation catalysts which can be utilized in this reaction are palladium, Raney nickel and cupric chromite. In carrying out this reaction, any conventional hydrogen acceptor can be utilized. Among the preferred hydrogen acceptors is oxygen which can be supplied by carrying out the reaction in the presence of air. Alternatively, the oxygen can be supplied in the form of bottled oxygen. Other hydrogen acceptors which can be advantageously utilized in this process are aliphatic ethers containing at least one ethylenic moiety bound to the oxygen atom and having from three to 15 carbon atoms such as methyl vinyl ether and cyclic ethers such as dihydropyran.

In converting the compound of formula V above to the compound of formula III above, no solvent need be present. Generally, in carrying out this reaction, a temperature of at least 50° C. should be utilized with temperatures of between 80° C. and 200° C., being preferred. If high temperatures are utilized, the reaction may be carried out under superatmospheric pressure.

The compound of formula III is converted to the compound of formula II via an intermediate of the formula:

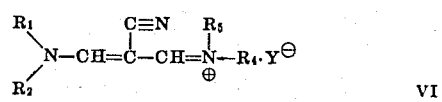

VI wherein R1 and R2 are as above; R5 and R4 are lower alkyl; and Y is a halide ion.

The conversion of compounds of the formula III above to compounds of the formula VI above is carried out by treating the compound of the formula II above with a dilower alkyl formamide in the presence of an inorganic acid halide condensing agent. These three reactants may be used in any molar ratio. In carrying out this reaction, temperatures of from about −10°to +10° C. are utilized. Generally, it is preferred to carry out this reaction in the presence of an inert organic solvent. Any conventional inert organic solvent can be utilized. However, the preferred solvents are the halogenated hydrocarbons such as chloroform, dichloromethane, 1,2-dichloroethane, etc. In carrying out this reaction, any of the lower alkyl formamides, preferably dimethyl formamide can be utilized. Among the preferred inorganic acid halide condensing agents which can be utilized in accordance with this invention are included phosphorus oxychloride, phosgene, thionyl chloride, phosphorus pentachloride, etc.

The compound of formula VI above is converted into the compound of formula II above by raising the pH of an aqueous solution containing the compound of formula VI above to a value of from 7 to 9. This is accomplished by treating the compound of formula VI above with an aqueous alkaline medium sufficient to raise the pH to a range of from 7 to 9. Any conventional inorganic base such as sodium hydroxide, potassium hydroxide, etc. can be utilized as the alkaline medium to provide a pH within the range of from about 7 to 9. In carrying out this reaction, temperature and pressure are not critical and this reaction can be carried out at room temperature and atmospheric pressure. If desired, elevated or reduced temperatures can be utilized.

The compound of formula II is converted to the compound of formula I via the following reaction scheme:

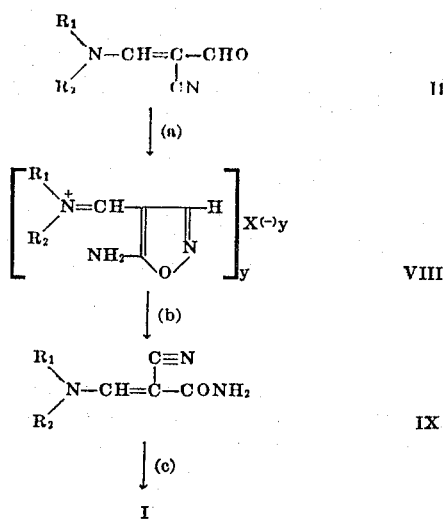

wherein R1 and R2 are as above; X is a halide ion or sulfate ion and $y$ is 1 when X is a halide ion and $y$ is 2 when X is a sulfate ion.

In accordance with this invention, the compound of formula II above is converted into the compound of formula VIII via reaction step (a) by reacting the compound of the formula II with a hydrohalic acid addition salt or a sulfate salt of hydroxylamine. This reaction is carried out at a temperature of from 0°to 25° C. in an inert organic solvent. Any conventional inert organic solvent can be utilized in carrying out this reaction with solvents such as lower alkanols including methanol, ethanol, or isopropanol being generally preferred. The reaction of step (a) is simply carried out by mixing the hydrohalic acid addition salt or sulfate salt of hydroxylamine with the compound of formula II above in an inert organic solvent while maintaining the temperature of from 0°–30° C. In carrying out this reaction of step (a), the preferred hydrohalic acid addition salt of hydroxylamine is hydroxylamine hydrochloride. In this reaction, the compound of formula II is reacted in equimolar amounts with the salt of hydroxylamine. However, if desired, an excess of the compound of formula II or the salt can be present in the reaction medium.

The compound of formula VIII is converted to the compound of formula IX by heating the compound of formula VIII in an inert organic solvent to a temperature of from 30° C. to the reflux temperature. In carrying out the reaction of step (b), any conventional inert organic solvent can be utilized. Generally, it is preferred to utilize the same solvent that was utilized in carrying out the reaction of step (a).

In accordance with a preferred embodiment of this invention, the compound of formula II can be directly converted to the compound of formula IX. This is accomplished by simply heating the compound of formula II with a hydrohalic acid addition salt, or sulfate salt of hydroxylamine at a temperature of from 30° C. to the reflux temperature. This reaction is preferably carried out in the presence of an inert organic solvent. Any conventional inert organic solvent can be utilized. Among the preferred inert organic solvents are the alcohols such as ethanol, methanol or isopropanol. The compound of formula II can be reacted in equimolar quantities with the salt of hydroxylamine. However, an excess of the compound of the formula II above or the hydroxylamine salt can be present in this reaction.

The compound of formula IX is converted to the compound of formula I, via reaction step (c) by reacting the compound of formula IX with acetamidine. The acetamidine that is utilized in this reaction is prepared by neutralizing an acetamidine hydrohalic acid addition salt. This neutralization of the acetamidine hydrohalic acid addition salt to produce the acetamidine utilized to react with the compound of formula IX is carried out by addition of a base. Any conventional base such as an alkali metal hydroxide or alkali metal lower alkoxide can be utilized. Generally, the neutralization reaction is carried out in the presence of an inert organic solvent. Any conventional inert organic solvent can be utilized. Among the preferred inert organic solvents are included lower alkanols such as methanol or ethanol. Generally, this neutralization reaction is carried out at temperatures from 0°to 30° C.

In preparing the compound of formula I, the acetamidine, which is liberated in an organic solvent solution by the neutralization of the hydrophalic acid salt of acetamidine, is mixed with the compound of formula IX. This mixture is then allowed to stand for a period of at least 5 hours at a temperature of 0°to 30° C., preferably room temperature. For best results, it has been found preferable to keep this reaction mixture ate this temperature for a period of from 20 to 25 hours. If desired, the reaction mixture can be kept at 0° to 30° C. for a period of 36 hours or longer. Since no additional beneficial results are achieved by keeping the reaction mixture standing at this temperature range for such prolonged periods, standing times of greater than 36 hours are seldom utilized. After this period, the reaction mixture is heated to a temperature of from 40° C. to the reflux temperature to carry out the conversion to the compound of formula I. In carrying out the reaction of step (c), the compound of formula IX is reacted in equimolar quantities with acetamidine. However, if desired, an excess of the compound of formula IX above or of acetamidine can be present.

This invention will be more fully understood from the specific examples which follow. These examples are intended to illustrate the invention and are not be be construed as limitative thereof. All temperatures are in degrees centigrade.

EXAMPLE 1

Dehydrogenation of dimethylaminopropionitrile to dimethylaminoacrylonitrile

The catalytic dehydrogenation of dimethylaminopropionitrile was carried out under the following conditions:

| Hydrogen Acceptor | Catalyst | Reaction Temp. | Reaction Time |
|---|---|---|---|
| Air | 10% Raney nickel | Relux: 115°C. | about 6 hours |
| Air | 30% CuCr$_2$O$_4$ | | 3–24 hours |
| CH$_2$ CHOCH$_2$CH$_3$ | palladium on carbon (10%) | 50°C. | 24 hours |
| Dihydropyran | palladium on carbon (10%) | Reflux: 80°C. | about 24 hours |
| Dihydropyran | palladium on carbon (10%) | Reflux | 40 hours |

In the above reaction a reaction mixture was prepared containing the catalyst and dimethylaminopropionitrile. Where an ether hydrogen acceptor was utilized, the hydrogen acceptor was present in a molar amount of ten times the moles of dimethylaminopropionitrile in the reaction mixture and the reaction was carried out under nitrogen. In the cases where air was used, the reaction was carried out by exposing the reaction mixture to the atmosphere. The catalyst was present in an amount of about 10 percent by weight or 30 percent by weight based upon the weight of the dimethylaminopropionitrile as indicated above. The final product obtained by vapor phase chromatography was dimethylaminoacrylonitrile. This product distilled at 115° C. at 3 mm Hg.

EXAMPLE 2

Preparation of 3-dimethylaminoacrylonitrile 173.0 g. of the diethylacetal of dimethylformamide (1.18 moles) and 400 ml. of acetonitrile were placed in a 1,200 ml. autoclave. Air was removed from the autoclave by flushing with nitrogen, and after purging charged to 50 p.s.i. with nitrogen. The reaction was carried out for 36 hours at 150° C. Upon completion of the reaction, excess acetonitrile was removed by vacuum distillation using a rotary evaporator at a vacuum of 135 mm Hg and a waterbath temperature of 60° C. maximum. The remaining residue was fractionated using a 24 inch Vigreaux column. After discarding a small first fraction, the material boiling at 115° C. and 3.0 mm Hg was collected. This material was 3-dimethylaminoacrylonitrile.

EXAMPLE 3

Preparation of (3-dimethylamino-2-cyano-2-propen-1-ylidene)-dimethylammonium perchlorate Ten milligrams of N,N-dimethylformamide were stirred at −4° to −7° and 10 ml. of phosphoroxy chloride were added dropwise in such a rate as to maintain the reaction temperature below 0°. The resulting semi-solid reaction mixture was diluted with 80 ml. of 1,2-dichloroethane. On warming to room temperature, a clear amber solution was obtained. The solution was cooled to −8° to −10° C. and 5.91 g. of 3-dimethylamino-acrylonitrile, dissolved in 15 ml. of 1,2-dichloroethane were added dropwise with stirring within 15 minutes. After removal of the solvent in vacuo a semi-crystalline residue was obtained. The material was dissolved in 20 g. of ice/water and 8.1 g. of sodium perchlorate were added to this solution. On cooling (3-dimethylamino-2-cyano-2-propen-1-ylidene)-dimethylammonium perchlorate as crystals, (m.p. 139°–142°) was obtained.

EXAMPLE 4

Thirty-six milliliters (0.465 mole) of N,N-dimethylformamide were stirred at 0° and 36 ml. (0.392 mole) of phosphorus oxychloride were added dropwise (a salt/ice bath was used in order to keep the reaction mixture at 0°). To the stirring semi-solid, faintly colored reaction mixture was added 300 ml. of 1,2-dichloroethane. Upon warming to room temperature by means of a water bath (25°), a clear solution resulted which was cooled to −7° with an ice-salt bath. A solution of 30 ml. (0.293 mole) of β-dimethylaminoacrylonitrile in 90 ml. of 1,2-dichloroethane was added dropwise keeping the temperature between −4° and −7°. The addition required about 1 hour. The cooling bath was removed and the clear amber reaction mixture allowed to come to room temperature. The reaction mixture was transferred to a 2 liter, round bottomed flask and the solvent removed in vacuo leaving a semi-solid orange colored residue. One hundred grams of ice was added to the residue which gradually dissolves with evolution of heat. The solution was transferred to a beaker and the pH adjusted to 8.4 by adding carefully 2N sodium hydroxide (815 ml. were required) to the stirred solution at 15°–20° C. The resulting solution was extracted with ethyl acetate in a liquid-liquid extractor overnight. The ethyl acetate extracted was cooled, the crystals which had separated were filtered off, washed with cold ethyl acetate and dried in vacuo, affording crude 2-cyano-3-dimethylaminoacrolein, as deep yellow prisms, m.p. 143°–144° C. This material was dissolved in 500 ml. of hot water, treated with 2 g. of norite, the solvent removed in vacuo and the residue crystallized from absolute ethanol, producing the pure product in the form of light yellow prisms, m.p. 143°–144° C.

EXAMPLE 5

Preparation of 5-amino-4-isoxazolylmethylene dimethyl ammonium chloride

To a solution containing 140 mg. 2-cyano-3-dimethylaminoacrolein in 15 ml. of methanol and 70 mg. of hydroxylamine hydrochloride was stirred at room temperature (20° C.) for 2 hours. After this period, a precipitate formed. This precipitate which was filtered off from the reaction mixture was 5-amino-4-isoxazolylmethylene dimethyl ammonium chloride; m.p. = 170° C.

EXAMPLE 6

Preparation of 3-dimethylamino-2-cyanoacrylamide

A mixture of 500 mg. of 5-amino-4-isoxazolylmethylene dimethyl ammonium chloride in 2 ml. of methanol was heated to reflux for 45 minutes. After this period the reaction mixture was filtered while still hot. On cooling to room temperature, there precipitated from the filtrate, 3-dimethylamino-2-cyanoacrylamide, m.p. 170°–174° C.

EXAMPLE 7

Preparation of 3-dimethylamino-2-cyanoacrylamide

To a solution of 24.8 g. of 2-cyano-3-dimethylaminoacrolein in 100 ml. of methanol was added a solution of 13.9 g. hydroxylamine hydrochloride in 100 ml. of methanol. The mixture was heated to reflux for 45 minutes and then filtered while still hot. On cooling to room temperature there precipitated from the filtrate 3-dimethylamino-2-cyanoacrylamide, m.p. 170°–174° C.

EXAMPLE 8

Preparation of 4-amino-2-methylpyrimidine 5-carboxamide

To a cooled solution of 1.0 g. acetamide hydrochloride in 10 ml. methanol was added a solution of 500 mg. sodium methoxide in 5 ml. methanol. The resulting mixture was filtered. The filtrate was allowed to come to room temperature (20° C.) and then 1.4 g. of 3-dimethylamino-2-cyano-acrylamide were added with stirring. The mixture was kept at room temperature (20° C.) for 24 hours. It was then heated to reflux for 1 hour and filtered hot. On cooling, 4-amino-2-methylpyrimidine-3-carboxamide crystallized from the filtrate, m.p. 265°–267° C.

We claim:

1. A compound of the formula:

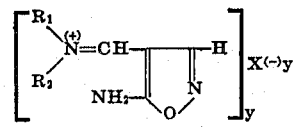

wherein $R_1$ and $R_2$ are lower alkyl; X is a halide or a sulfate; and $y$ is 1 when X is a halide and $y$ is 2 when X is sulfate.

2. The compound of claim 1 wherein $R_1$ and $R_2$ are methyl and X is a chloride ion.

3. A process for the preparation of a compound of the formula:

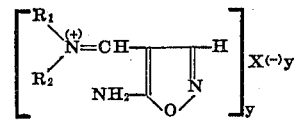

wherein $R_1$ and $R_2$ are lower alkyl; X is a halide or a sulfate; and $y$ is 1 when X is a halide and $y$ is 2 when X is sulfate; comprising reacting at a temperature of from 0° to 25° C., a 2-cyano-3-di(lower alkyl)amino-acrolein with a hydrohalic acid addition salt or sulfate salt of hydroxylamine.

* * * * *

UNITED STATES PATENT OFFICE
CERTIFICATE OF CORRECTION

Patent No. 3,689,498      Dated September 5, 1972

Inventor(s) Willy Leimgruber & Manfred Weigele

It is certified that error appears in the above-identified patent and that said Letters Patent are hereby corrected as shown below:

Claim 2, Column 8, Line 27, "X" should be $X^{\ominus}$

Signed and sealed this 29th day of May 1973.

(SEAL)
Attest:

EDWARD M. FLETCHER, JR.
Attesting Officer

ROBERT GOTTSCHALK
Commissioner of Patents